United States Patent [19]

Mortensen

[11] 4,060,002
[45] Nov. 29, 1977

[54] APPARATUS FOR THE DETERMINATION OF UNBALANCE IN ROTATING BODIES

[76] Inventor: Angel J. Mortensen, Eskildstrup, Roennede, Denmark, DK 4683

[21] Appl. No.: 586,173

[22] Filed: June 12, 1975

[30] Foreign Application Priority Data

June 12, 1974 Denmark .............................. 3126/74

[51] Int. Cl.² ............................................. G01M 1/22
[52] U.S. Cl. ..................................................... 73/462
[58] Field of Search .......................... 73/462, 71.4, 67; 328/165, 151; 235/151.3

[56] References Cited

U.S. PATENT DOCUMENTS

| 3,087,487 | 4/1963 | Clynes | 328/165 |
| 3,147,624 | 9/1964 | Trimble | 73/462 |
| 3,297,860 | 1/1967 | Weiss | 324/0.5 AX |
| 3,681,978 | 8/1972 | Mathias et al. | 73/71.4 |
| 3,699,806 | 10/1972 | Weichbrodt | 73/71.4 |

OTHER PUBLICATIONS

"Electronic Measurements Using Statistical Techniques", by S. L. Silver from Electronics World, June, 1968, pp. 49-53.

Primary Examiner—James J. Gill
Attorney, Agent, or Firm—Fay & Sharpe

[57] ABSTRACT

A balancing system for the determination of unbalance in rotating bodies in which noise problems are reduced by the formation of average values of the vibration signals generated by the rotating bodies, each average value corresponding to each of a number of angular positions of the rotating body. Transducers are used to convert the mechanical vibration of a rotating body to an electrical signal which is then periodically sampled with the value of the sample being stored in a memory cell. The samples for each revolution are then used to form either an average value or an exponential average value. The average values so obtained have a relatively high signal to noise ratio.

7 Claims, 7 Drawing Figures

APPARATUS FOR THE DETERMINATION OF UNBALANCE IN ROTATING BODIES

BACKGROUND OF THE INVENTION

This invention relates to an apparatus for the determination of unbalance in rotating bodies and in which the unbalance determination is carried out by an analysis with reference to phase and amplitude of the mechanical vibrations caused by rotating masses in unbalance. The mechanical vibrations are measured as motions, forces or pressures by means of transducers, which convert the mechanical vibrations to electrical signals. Each signal is the combination of fundamental oscillations caused by the unbalances, and noise.

A frequent problem that is encountered in apparatus of this type is that the noise signal may contribute a large part, sometimes even the most significant part of each electrical signal and, thereby, demanding an improvement of the signal to noise ratio before a proper analysis of the unbalances can be carried out.

A well-known method to improve the signal to noise ratio of the unbalance signal from a rotating body is to fix a known mass to the rotating mass, the unbalance of which must be determined. The electrical signal from the measuring transducer will then be the combination of signals caused by the unknown unbalance and the unbalance caused by the added mass, as well as the noise signal.

By moving the known mass to different points on the circumference of the rotating body and in each point measure the vibratory signal, the contribution to the signal by noise can be reduced and that by the known mass be eliminated by graphical and arithmetic means.

From the description of U.S. Pat. No. 3,147,624, it is known that a predetermined unbalance may be added electronically to an unknown unbalance signal and be moved in phase relatively to that signal in order to obtain the possibility to improve the signal to noise ratio without the application and change of additional mass to the rotating body.

Another well-known method for removal of noise signals is to use electronic filters which, however, may contribute large phase changes to the signal, if the speed of the rotating body deviates from the centre frequency of the filter.

THE INVENTION DESCRIBED

This invention solves the problem of small signal to noise ratios by the formation of average values of the vibration of the rotating body.

Figure 4:
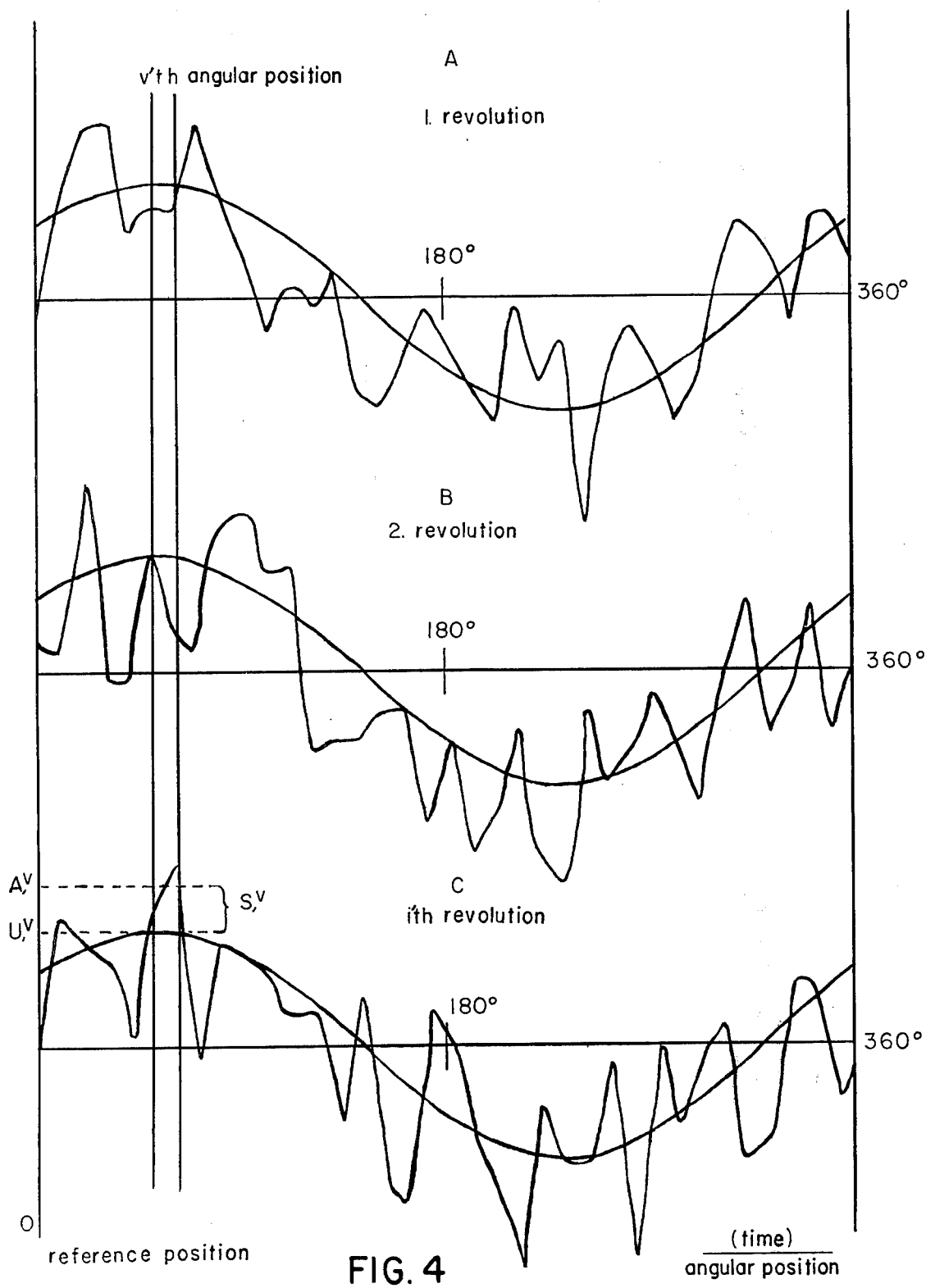
FIG. 4 is a diagrammatic representation of the instantaneous vibration amplitude upon which is superimposed a noise signal.

For each revoluation of the body, the vibration signal will resemble a period of a sinusoidal signal, upon which is superimposed a noise signal. (See FIGS. 4a, b and c.)

The amplitude of the sinusoidal signal represents the magnitude of the unbalance, and its phase relatively to the reference position determines its angular position.

For each angular position a sample of the instantaneous vibration amplitude is taken for each revolution of the rotating body. The samples are used to form either an average value or the exponential average for a number of revolutions. Exponential average being the general term which describes the output functions of both an RC averaging circuit and a digital circuit which simulates the RC averaging function.

In FIG. 4c is shown that the instantaneous value for angular position $v$ for the $i$-th revolution is:

$$A_i^v = U_i^v + S_i^v$$

where U is the unbalance component and S the noise.

By summation of $n$ signal values and division by $n$ an average value is formed:

$$A_{average}^v = \frac{\sum_{i=1}^{i=n} U_i^v \quad \sum_{i=1}^{i=n} S_i^v}{n}$$

If the noise component is not synchronized with the rotation of the body to be balanced the noise components for the various revolutions are partly cancelling each other, whereby the resulting noise signal is reduced by a factor $1/\sqrt{n}$.

For exponential averaging a similar reduction of noise compared to signal is observed.

Figure 5:
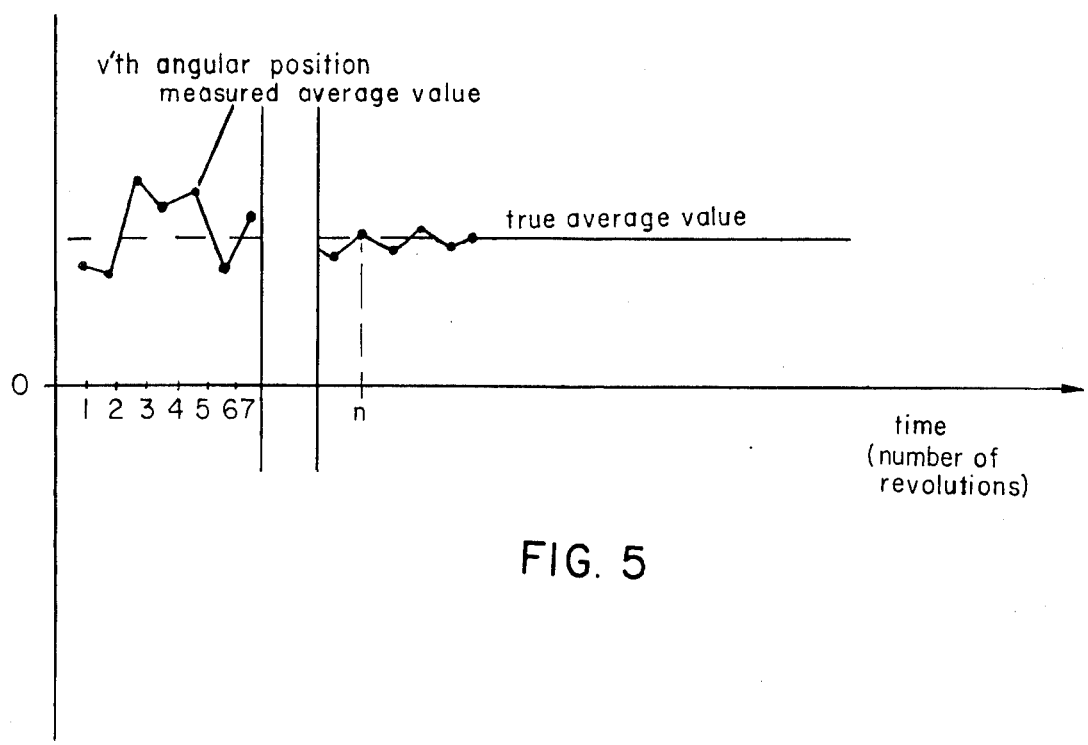
FIG. 5 is a diagram of the measured average value which approaches the true average value when the number of revoluations is high.

In FIG. 5 it is shown how the measured average value for each position approaches the true average value, when the number of revolutions is high.

Figure 6:
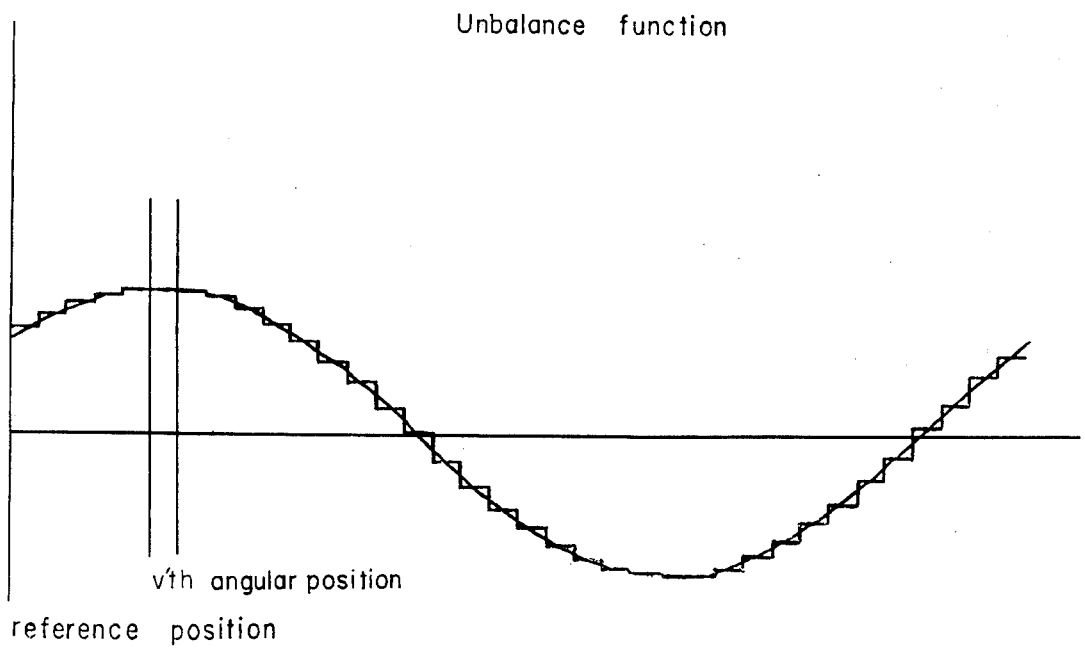
FIG. 6 is a diagram of the measured average value which represents the true unbalance function by a stepped curve.

FIG. 6 shows how the measured average values represent the true unbalance function by a stepped curve, from which the unbalance magnitude and angular position may be determined.

Figure 7:
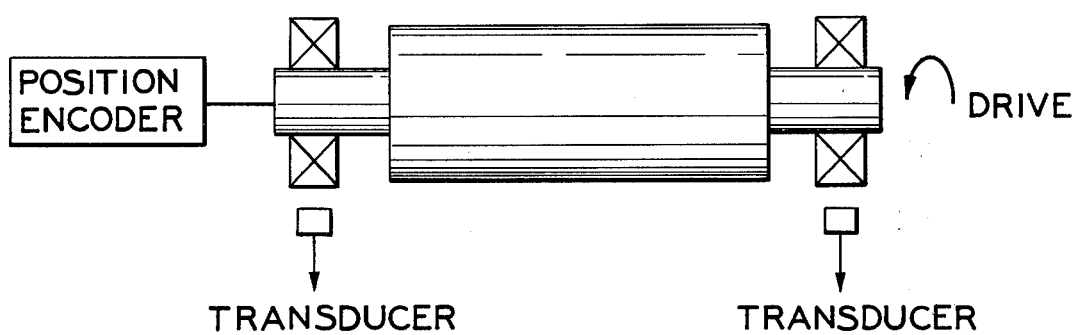
FIG. 7 is a schematic drawing of the test bench.

FIG. 7 shows the test bench.

To evaluate the unbalances of a rotating body using the described principles, this invention comprises an electronic apparatus, which includes sampling circuits, an angular position indicating device which delivers signals for a predetermined number of angular positions (e.g. 100) and storing means for each angular position, in which predetermined fractions of the sample signals are stored during a number of revolutions to form average values.

The storing means, according to the invention, may be accumulating circuits, or more specific they can be capacitors or digital memory cells as well as other storage facilities.

Figure 1:
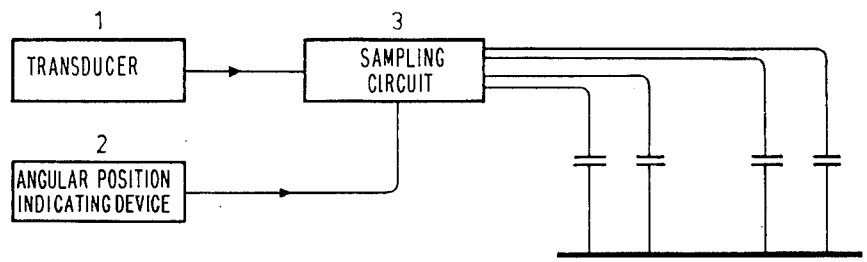
FIG. 1 is a schematic drawing of the invention.
Figure 2:
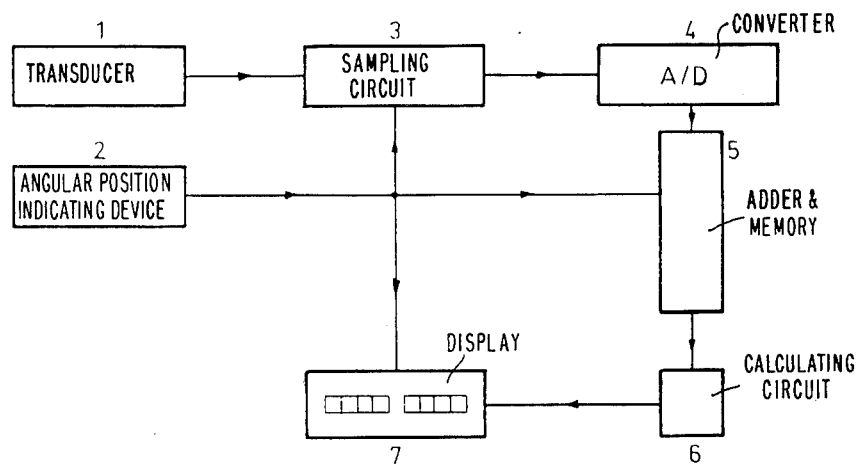
FIG. 2 is a schematic drawing of another form of the invention.

In FIGS. 1 and 2, (1) represents the transducers, which convert the vibrational signals from the rotating body into electrical signals. These signals are fed to sampling circuits 3, the operation of which is controlled by signals from the angular position indicating device 2.

For each angular position, the corresponding memory cells, one for each measuring channel, receive signals corresponding to the instantaneous amplitudes of the electrical signals from the transducers. (See FIG. 4)

By means of averaging, exponential, linear or other averaging, an average value is formed and stored in each memory cell.

The storage means of FIG. 1 are capacitors, which may also be part of the sampling and averaging system.

The storage means of FIG. 2 is a digital memory. The sampled instantaneous values are fed via an analog to digital converter 4 to an adder and memory 5.

The memory has as many memory cells, for each measuring channel, as the predetermined number of angular positions. For a given angular position the sampled values are used to form a linear or exponential average value, which is then stored in the corresponding memory cell.

From the stored values, which represent the stepped curve of FIG. 6, the amplitude and position of the unbalance may be calculated in an electrical circuit 6 of FIG. 2, and displayed in 7, both during rotation of the body to be balanced and when it is at a standstill. These values may similarly be used in the control of machines for elimination of the measured unbalances. For this purpose the angular position indicating device described below also features the ability to indicate the angular position of the body when it is rotated and at standstill.

Figure 3:
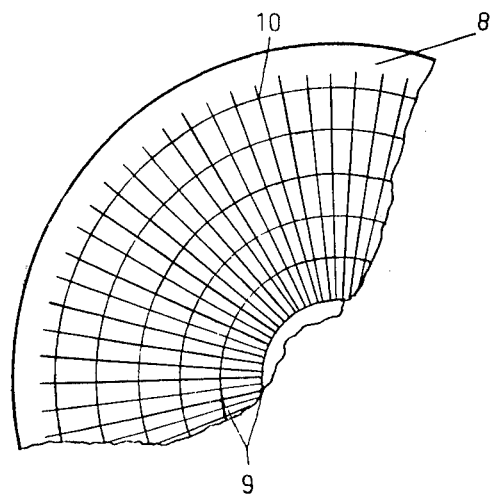
FIG. 3 is a part of an angular position indicating device.

FIG. 3 shows a part of an angular position indicating device, a circular disc +), which is driven synchronously with the rotating body in the test bench. On the disc 8 are placed contact points 9 and 10 (the contact points may be cams, holes, mirrors or other configurations, which may be used to establish contact in the given points) along concentric circles at the points of intersection of the circles with as many radii as the number of predetermined angular positions. The points along one of the circles 10 are used as synchronizing contact points and deliver control impulses for the sampling and storage circuits during revolution. On the remaining circles the contact points 9, for each radius, are placed or omitted in accordance with the actual angular distance from a predetermined zero position and according to a predetermined code, e.g. binary, Gray or BCD-representation.

+) This part of the angular position indicating device may be any other body of rotation on which an array of a number of contact points for each predetermined angular position may be arranged.

What is claimed is:

1. An apparatus for determination of unbalance in rotating bodies consisting of:
    a test bench in which a body can be fixed and rotated,
    devices which measure the vibrations caused by the rotating body unbalances and convert mechanical vibrations or pressure variations to electrical signals,
    electronic instrument means to evaluate the amplitudes and angular positions of the unbalances from the electrical signals, said electronic instrument means comprising sampling circuits for sampling said signals, an angular position indicating device connected to said test bench and body which delivers corresponding signals for each of a predetermined number of angular positions, e.g. 100, to said sampling circuits for activating said circuits, and storing means in which predetermined fractions of the sampled signals are stored during a number of revolutions to form average values for each of the predetermined angular positions.

2. An apparatus according to claim 1, wherein the said storing means are capacitors.

3. An apparatus according to claim 1, wherein the said storing means are accumulating circuits.

4. An apparatus according to claim 3, comprising an analog-to-digital-converter to which the sampled instantaneous values are fed.

5. An apparatus according to claim 4, wherein the said angular position indicating device consists of a disc, or another body of revolution, which rotates with the rotating body and which has contact points placed at the points of intersection between concentric circles and radii for a disc, and between parallel perimeter lines and radial planes for a cylinder, said radii or radial planes corresponding to the predetermined angular positions so that the number and position of contact points correspond to the angular position.

6. An apparatus according to claim 5, wherein a synchronizing contact point is positioned at each point of intersection between one of the circles and the predetermined radii.

7. An apparatus according to claim 5, comprising devices for display of the position of the said angular position indicating device, also during standstill.

* * * * *